US011558448B1

(12) United States Patent
Sui et al.

(10) Patent No.: US 11,558,448 B1
(45) Date of Patent: Jan. 17, 2023

(54) SPARSE INFORMATION SHARING SYSTEM

(71) Applicant: International Business Machines Corporation, Armonk, NY (US)

(72) Inventors: Guang Han Sui, Beijing (CN); Peng Hui Jiang, Beijing (CN); Xing Xing Shen, Beijing (CN); Jun Su, Beijing (CN); Hai Ling Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/448,361

(22) Filed: Sep. 22, 2021

(51) Int. Cl.
*H04L 29/06* (2006.01)
*H04L 7/033* (2006.01)
*H04L 29/08* (2006.01)
*H04L 29/12* (2006.01)
*H04L 67/01* (2022.01)
*H04L 67/562* (2022.01)
*H04L 67/5682* (2022.01)
*G06F 1/12* (2006.01)
*G06F 9/455* (2018.01)
*G06F 16/25* (2019.01)

(52) U.S. Cl.
CPC ............ *H04L 67/01* (2022.05); *H04L 67/562* (2022.05); *H04L 67/5682* (2022.05)

(58) Field of Classification Search
USPC ....................................................... 709/203
See application file for complete search history.

(56) References Cited

U.S. PATENT DOCUMENTS

| 10,691,438 | B1 | 6/2020 | Lyadvinsky | |
|---|---|---|---|---|
| 10,928,811 | B2 | 2/2021 | Xin | |
| 11,005,949 | B1* | 5/2021 | Baturin | H04L 61/4511 |
| 2008/0183810 | A1 | 7/2008 | Ruedlinger | |
| 2009/0247134 | A1* | 10/2009 | Jeide | H04L 67/568 455/414.2 |
| 2009/0282125 | A1* | 11/2009 | Jeide | H04L 67/1095 709/217 |
| 2016/0285819 | A1* | 9/2016 | Yadava | G06F 21/602 |
| 2017/0192988 | A1* | 7/2017 | Giertler | G06F 16/134 |
| 2017/0295246 | A1* | 10/2017 | Georgiou | H04L 43/0864 |
| 2017/0329942 | A1* | 11/2017 | Choi | G06T 1/005 |
| 2018/0198878 | A1* | 7/2018 | Keldenich | H04L 67/563 |
| 2019/0028531 | A1* | 1/2019 | Nagar | G06F 8/33 |
| 2019/0297147 | A1* | 9/2019 | Drasin | H04L 67/141 |
| 2020/0348990 | A1 | 11/2020 | Katzenberger | |
| 2021/0049205 | A1* | 2/2021 | Frank | G06F 16/901 |
| 2021/0056077 | A1* | 2/2021 | Sapru | G06F 16/176 |
| 2021/0303021 | A1* | 9/2021 | Cui | G06F 1/12 |

FOREIGN PATENT DOCUMENTS

CN 110888843 A 3/2020

* cited by examiner

*Primary Examiner* — Jude Jean Gilles
(74) *Attorney, Agent, or Firm* — Stephanie L. Carusillo

(57) ABSTRACT

In an approach for a sparse information sharing system, a processor receives a request from a host owner for a host to become a server of an information sharing system, wherein the request specifies at least one type of information the server will maintain and provide to visitors of the server. A processor syncs the server with other servers of the information sharing system with information of the specified at least one type of information. A processor, responsive to the server receiving updated information from a visitor of the server, notifies the other servers of the updated information.

20 Claims, 3 Drawing Sheets

SPARSE INFORMATION SHARING SYSTEM

BACKGROUND OF THE INVENTION

The present invention relates generally to the field of information sharing systems, and more particularly to a sparse information sharing system.

Current information sharing systems are based on one centralized management system, e.g., servers are controlled by a company or a cloud provider. These systems can be broken causing all the information on them to be lost. Additionally, these systems can be isolated and hard to share.

SUMMARY

Aspects of an embodiment of the present invention disclose a method, computer program product, and computer system a sparse information sharing system. A processor receives a request from a host owner for a host to become a server of an information sharing system, wherein the request specifies at least one type of information the server will maintain and provide to visitors of the server. A processor syncs the server with other servers of the information sharing system with information of the specified at least one type of information. A processor, responsive to the server receiving updated information from a visitor of the server, notifies the other servers of the updated information.

In some aspects of an embodiment of the present invention, the information sharing system comprises several servers that provide service for the whole information sharing system with each sever having only a part of the information of the information sharing system.

In some aspects of an embodiment of the present invention, syncing the server with the other servers comprises a processor syncing the information of the information sharing system point-to-point with no central point.

In some aspects of an embodiment of the present invention, a processor enables each server of the information sharing system to get respective updated information from respective server owners directly or indirectly.

In some aspects of an embodiment of the present invention, notifying the other servers of the updated information further comprises a processor enabling the server to sign the updated information with a signature of a server owner, a timestamp, an original source, and a change history.

In some aspects of an embodiment of the present invention, a processor enables a respective server to reject respective updated information from a specified server owner.

In some aspects of an embodiment of the present invention, a processor enables the respective server to remove the respective updated information and any information from the specified server owner.

DETAILED DESCRIPTION

Figure 1:
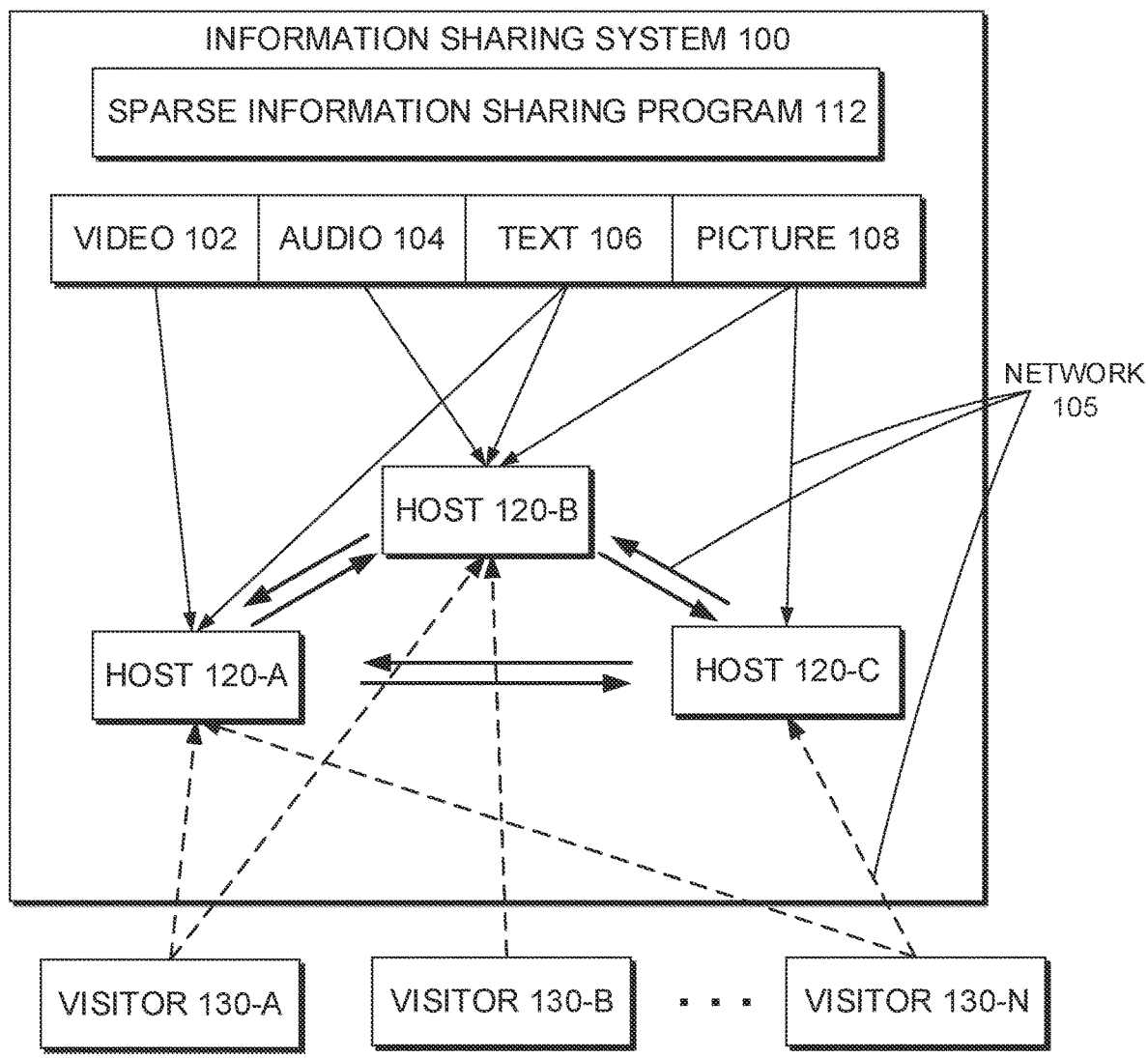
FIG. 1 depicts an example system illustrating how different information in an information sharing system is stored on different hosts.

Embodiments of the present invention provide a system and method for sparse information sharing in which any host can work as a server for part of or the whole system. A host is any type of computing machine or hardware, and once a host provides some services (e.g., shares video data), the host can be considered a server of the system. Several servers provide service for the whole information system with each sever having only a part of the information of the system. The servers sync up information point to point with no central point. Visitors of a server can add/update information on a server, and then this added/updated information is synced up to the other servers enabling other visitors of those other servers to see the added/updated information. Embodiments of the present invention have several advantages: (1) no single point of failure; (2) robust and hard to shutdown; and (3) easy to share information.

A host owner can make the host the server for a selected part of the system, such a host owner is then named server owner. With the specified server addresses and preferred information for sharing, a server can get the needed information and share to visitors. For example, if a server owner's preferred information is video and picture data, then video and picture data is the needed information for this server as this server will download and share this information to visitors. Thus, any host (e.g., personal computer, powerful server, virtual host on a cloud, etc.) can be a server of this system that has independent servers, so that when one or more servers are down, other servers still can provide service.

The information in the system and server's information (e.g., address, owner information, etc.) can be shared among servers of the system. Thus, information can be updated timely, visitors can get information from several servers, and visitors can access a backup server when a preferred server is down. A server can get information of this system from specified server owners directly or indirectly. Thus, the server can ensure that the received information is trustable. For example, if server A trusts server B, then server A can get information from server B. If server A trusts server C and server C trusts server D, then server A can trust server D indirectly and get information from server D. If server A does not trust server E, server A will not get information from server E.

A server owner can reject/remove information of this system from specified server owners. For example, for a server owner previously trusted but not trusted anymore, a server can reject receiving more information from the server owner. If there is information from the now not trusted server owner still in the server, this information can be removed.

A server will combine the information on the current server and other servers, sign with owner's signature and other information (e.g., timestamp, original source, change history, etc.), and share this information and server's address to other servers and visitors. The system uses access control to allow different visitors to have different views across different information sharing system.

Implementation of embodiments of the invention may take a variety of forms, and exemplary implementation details are discussed subsequently with reference to the Figures.

FIG. 1 depicts an example information sharing system 100 illustrating how different information in a sparse information sharing system is stored on different hosts. In the depicted embodiment, information data in information sharing system 100 includes video 102, audio 104, text 106, and picture 108. Hosts 120 (i.e., servers) host or store one or more of the specified types of information data. Host 120-A stores video 102 and text 106 information. Host 120-B stores audio 104, text 106, and picture 108 information. Host 120-C stores picture 108 information. Each of these hosts 120 sync up with each other so that visitors 130 (depicted as visitor 130-A, 130-B, ... 130-N, in which N represents any number of visitors) of one of the hosts 120 can view information stored on any of the hosts 120 of information sharing system 100.

FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network 105 can be, for example, a telecommunications network, a local area network (LAN), a wide area network (WAN), such as the Internet, or a combination of the or more wired and/or wireless networks capable of receiving and transmitting data, voice, and/or video signals, including multimedia signals that include voice, data, and video information. In general, network 105 can be any combination of connections and protocols that will support communications between hosts 120, visitors 130, and other computing devices (not shown) within information sharing system 100.

In the depicted embodiment, three hosts 120 are shown but any number of hosts 120 may be a server within information sharing system 100. Hosts 120 each can be a standalone computing device, a management server, a web server, a mobile computing device, or any other electronic device or computing system capable of receiving, sending, and processing data. In other embodiments, hosts 120 can represent a server computing system utilizing multiple computers as a server system, such as in a cloud computing environment. In another embodiment, hosts 120 can each be a laptop computer, a tablet computer, a netbook computer, a personal computer (PC), a desktop computer, a personal digital assistant (PDA), a smart phone, or any programmable electronic device capable of communicating with other hosts 120, visitors 130, and other computing devices (not shown) within information sharing system 100 via network 105. In another embodiment, hosts 120 represent a computing system utilizing clustered computers and components (e.g., database server computers, application server computers, etc.) that act as a single pool of seamless resources when accessed within information sharing 100. Hosts 120 may include internal and external hardware components, as depicted and described in further detail with respect to FIG. 3.

Sparse information sharing program 112 operates as a method for building a host as a server in an information sharing system, e.g., information sharing system 100. In an embodiment, sparse information sharing program 112 builds a host as a server by: receiving a request from a host owner for a host to become a server of the system, wherein the request specifies the type of information the server will download and provide to visitors; syncing the server with other servers of the system for updated information of the specified type; and responsive to the server receiving updated information from a visitor, notifying other servers of the updated information. In the depicted embodiment, sparse information sharing program 112 is a standalone program. In another embodiment, sparse information sharing program 112 may be integrated into another software product. Sparse information sharing program 112 is depicted and described in further detail with respect to FIG. 2.

Visitors 130 each operates as a computing device associated with a user on which the user can interact with hosts 120 of information sharing system 100 through an application user interface. In an embodiment, visitors 130 each can be a laptop computer, a tablet computer, a smart phone, a smart watch, an e-reader, smart glasses, wearable computer, or any programmable electronic device capable of communicating with various components and devices within information sharing system 100, via network 105. In general, visitors 130 represent one or more programmable electronic devices or combination of programmable electronic devices capable of executing machine readable program instructions and communicating with other computing devices (not shown) within information sharing system 100 via a network, such as network 105.

Figure 2:
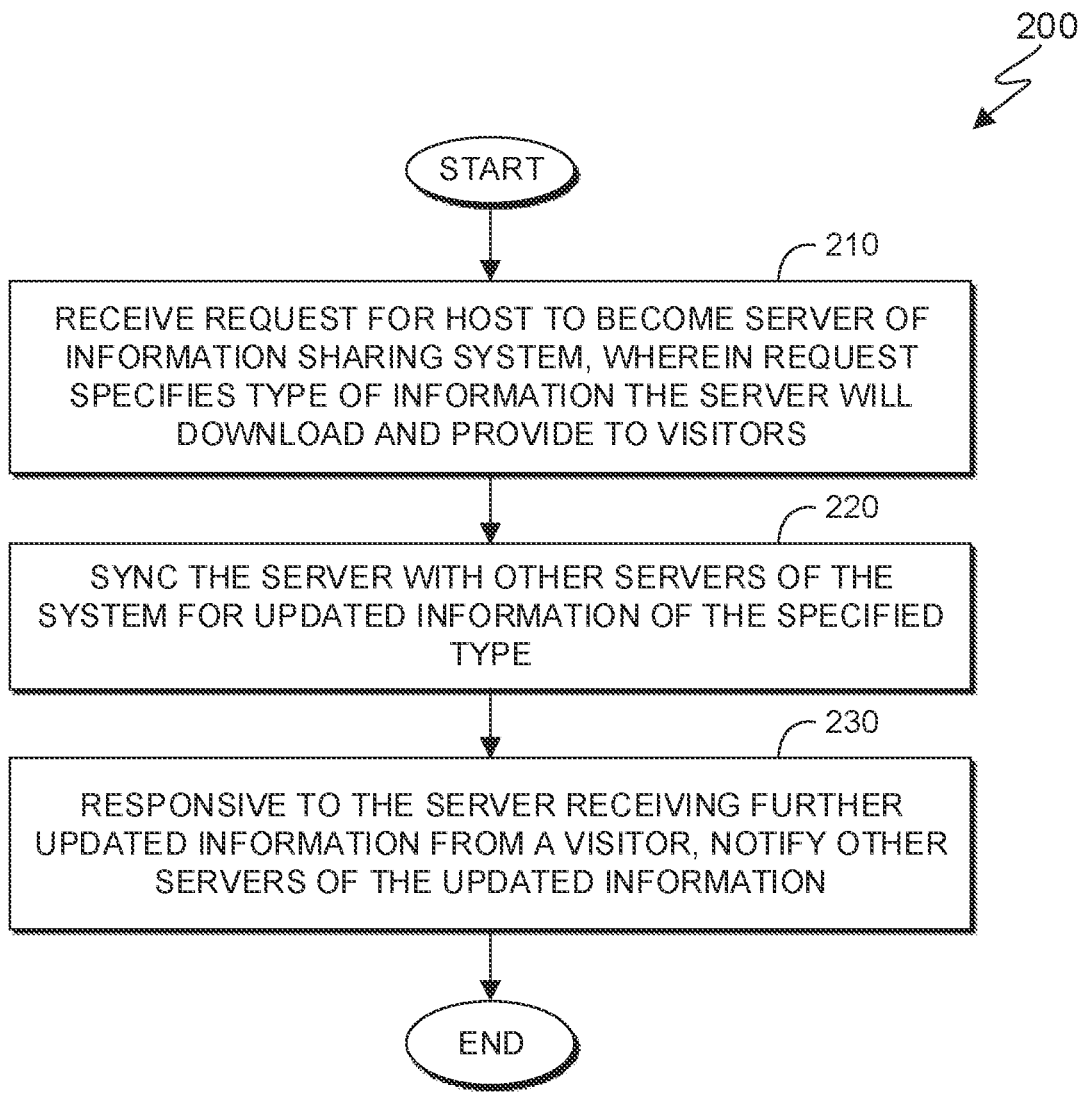
FIG. 2 is a flowchart depicting operational steps of a sparse information sharing program, for sparse information sharing, in accordance with an embodiment of the present invention.
Figure 3:
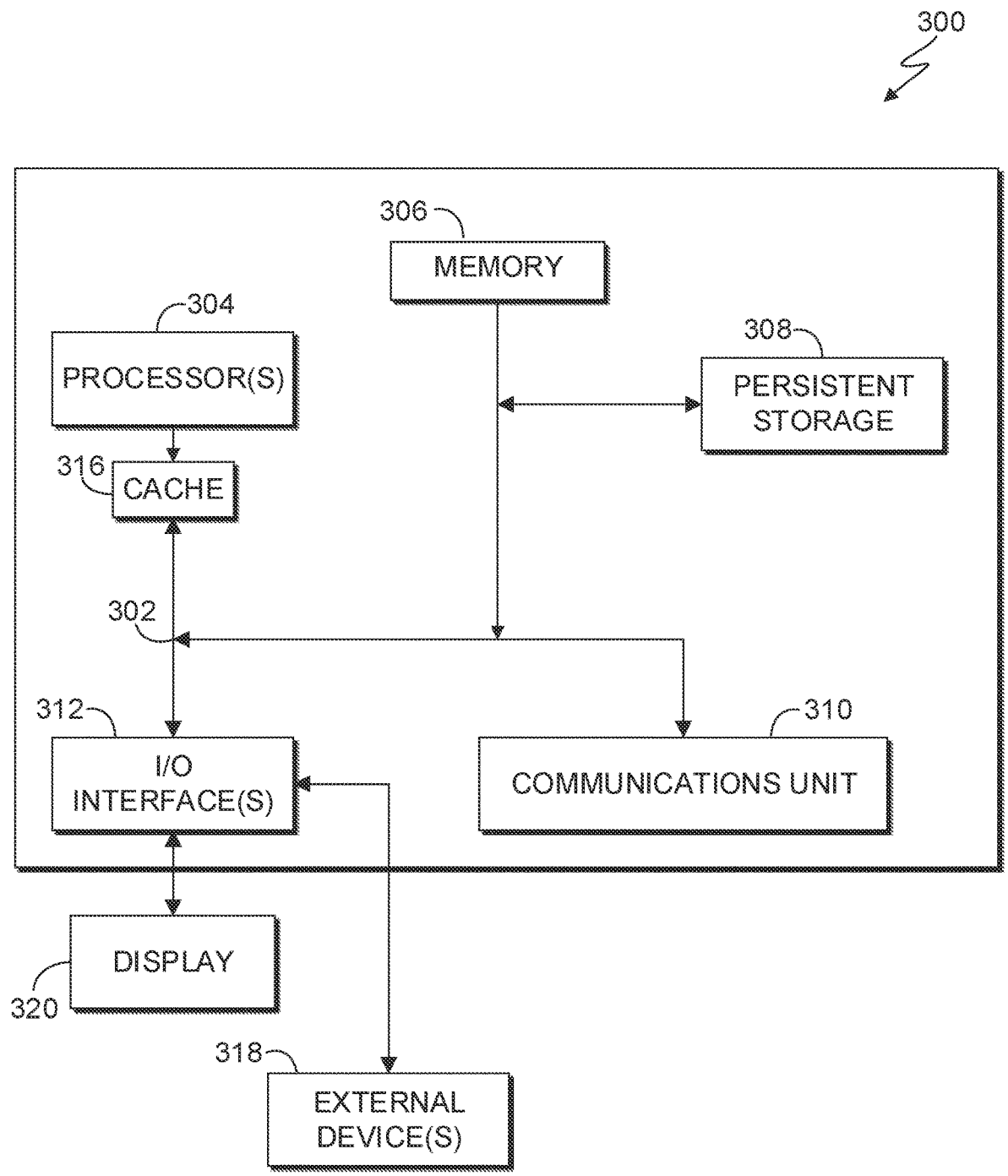
FIG. 3 depicts a block diagram of components of a computing device of the distributed data processing environment of FIG. 1, in accordance with an embodiment of the present invention.

FIG. 2 is a flowchart 200 depicting operational steps of sparse information sharing program 112, for building a host as a server in an information sharing system. It should be appreciated that the process depicted in FIG. 3 illustrates one possible iteration of sparse information sharing program 112.

In step 210, sparse information sharing program 112 receives a request from a host owner for a host to become a server of the information sharing system ("the system"), wherein the request specifies the type of information the server will download/maintain and provide the specified information to visitors of the server. In this information sharing system, several servers provide service for the whole information sharing system with each sever having only a part of the information of the system. For example, sparse information sharing program 112 receives a request from user A for their laptop to become a server of the system, and the request specifies the server will download and maintain video data and audio data and provide video data and audio data to visitors. In some embodiments, sparse information sharing program 112 needs to approve of the host becoming a server of the system.

In step 220, sparse information sharing program 112 syncs the server with other servers of the system for updated information of the specified type. The servers of the information sharing system sync up information point-to-point with no central point. In an embodiment, responsive to the host becoming a new server of the system, sparse information sharing program 112 syncs information on the new server with updated information from all other servers of the system that have information of the specified type. Syncing between the servers of the system enables information to be updated timely, visitors to get information from several servers, and visitors to access a backup server when a preferred server is down. A server can get information of the system from specified server owners directly or indirectly. A server will combine the information on the current server and other servers, sign with owner's signature and other information (e.g., timestamp, original source, change history, etc.), and share this information and server's address to other servers and visitors.

In step 230, sparse information sharing program 112, responsive to the server receiving updated information from a visitor, notifies other servers of the updated information. Visitors of a server can add/update information on a server, and then this added/updated information is synced up to the other servers enabling other visitors of those other servers to see the added/updated information. In an embodiment, responsive to new information of a specified type being added to a server (e.g., by a visitor of the server) of the system, sparse information sharing program 112 syncs this new information on all servers of the system that maintain that specified type of information.

In some embodiments, sparse information sharing program 112 enables a server owner to reject/remove information of this system from specified server owners. For example, for a server owner previously trusted but not trusted anymore, sparse information sharing program 112 enables a server to reject receiving more information from the server owner. If there is information from the now not trusted server owner still in the server, sparse information sharing program 112 removes this information.

FIG. 3 depicts a block diagram of components of computing device 300, suitable for hosts 120 running sparse information sharing program 112 within information sharing system 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to hosts 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a request from a host owner for a host to become a server of an information sharing system, wherein the request specifies at least one type of information the server will maintain and provide to visitors of the server;
   syncing, by the one or more processors, the server with other servers of the information sharing system with information of the specified at least one type of information; and
   responsive to the server receiving updated information from a visitor of the server, notifying, by the one or more processors, the other servers of the updated information.

2. The computer-implemented method of claim 1, wherein the information sharing system comprises several servers that provide service for the whole information sharing system with each sever having only a part of the information of the information sharing system.

3. The computer-implemented method of claim 1, wherein syncing the server with the other servers comprises:
   syncing, by the one or more processors, the information of the information sharing system point-to-point with no central point.

4. The computer-implemented method of claim 1, further comprising:
   enabling, by the one or more processors, each server of the information sharing system to get respective updated information from respective server owners directly or indirectly.

5. The computer-implemented method of claim 1, wherein notifying the other servers of the updated information further comprises:
   enabling, by the one or more processors, the server to sign the updated information with a signature of a server owner, a timestamp, an original source, and a change history.

6. The computer-implemented method of claim 1, further comprising:

enabling, by the one or more processors, a respective server to reject respective updated information from a specified server owner.

7. The computer-implemented method of claim 6, further comprising:
enabling, by the one or more processors, the respective server to remove the respective updated information and any information from the specified server owner.

8. A computer program product comprising:
one or more computer readable storage media and program instructions collectively stored on the one or more computer readable storage media, the stored program instructions comprising:
program instructions to receive a request from a host owner for a host to become a server of an information sharing system, wherein the request specifies at least one type of information the server will maintain and provide to visitors of the server;
program instructions to sync the server with other servers of the information sharing system with information of the specified at least one type of information; and
responsive to the server receiving updated information from a visitor of the server, program instructions to notify the other servers of the updated information.

9. The computer program product of claim 8, wherein the information sharing system comprises several servers that provide service for the whole information sharing system with each sever having only a part of the information of the information sharing system.

10. The computer program product of claim 8, wherein the program instructions to sync the server with the other servers comprise:
program instructions to sync the information of the information sharing system point-to-point with no central point.

11. The computer program product of claim 8, further comprising:
program instructions to enable each server of the information sharing system to get respective updated information from respective server owners directly or indirectly.

12. The computer program product of claim 8, wherein the program instructions to notify the other servers of the updated information further comprise:
program instructions to enable the server to sign the updated information with a signature of a server owner, a timestamp, an original source, and a change history.

13. The computer program product of claim 8, further comprising:
program instructions to enable a respective server to reject respective updated information from a specified server owner.

14. The computer program product of claim 13, further comprising:
program instructions to enable the respective server to remove the respective updated information and any information from the specified server owner.

15. A computer system comprising:
one or more computer processors;
one or more computer readable storage media;
program instructions collectively stored on the one or more computer readable storage media for execution by at least one of the one or more computer processors, the stored program instructions comprising:
program instructions to program instructions to receive a request from a host owner for a host to become a server of an information sharing system, wherein the request specifies at least one type of information the server will maintain and provide to visitors of the server;
program instructions to sync the server with other servers of the information sharing system with information of the specified at least one type of information; and
responsive to the server receiving updated information from a visitor of the server, program instructions to notify the other servers of the updated information.

16. The computer system of claim 15, wherein the information sharing system comprises several servers that provide service for the whole information sharing system with each sever having only a part of the information of the information sharing system.

17. The computer system of claim 15, wherein the program instructions to sync the server with the other servers comprise:
program instructions to sync the information of the information sharing system point-to-point with no central point.

18. The computer system of claim 15, further comprising:
program instructions to enable each server of the information sharing system to get respective updated information from respective server owners directly or indirectly.

19. The computer system of claim 15, wherein the program instructions to notify the other servers of the updated information further comprise:
program instructions to enable the server to sign the updated information with a signature of a server owner, a timestamp, an original source, and a change history.

20. The computer system of claim 15, further comprising:
program instructions to enable a respective server to reject respective updated information from a specified server owner; and
program instructions to enable the respective server to remove the respective updated information and any information from the specified server owner.

* * * * *